United States Patent
Castellanos et al.

(10) Patent No.: US 12,039,760 B2
(45) Date of Patent: Jul. 16, 2024

(54) MODIFYING PROMOTIONAL MATERIAL USING LOGO IMAGES

(71) Applicant: Hub Promotional Group, Briantree, MA (US)

(72) Inventors: Oscar Castellanos, Braintree, MA (US); Peter Rodinis, Braintree, MA (US)

(73) Assignee: Hub Promotional Group, Braintree, MA (US)

( * ) Notice: Subject to any disclaimer, the term of this patent is extended or adjusted under 35 U.S.C. 154(b) by 298 days.

(21) Appl. No.: 17/706,967

(22) Filed: Mar. 29, 2022

(65) Prior Publication Data

US 2022/0319051 A1  Oct. 6, 2022

Related U.S. Application Data

(60) Provisional application No. 63/169,343, filed on Apr. 1, 2021.

(51) Int. Cl.
*G06T 7/90*      (2017.01)
*G06Q 30/0241*   (2023.01)
*G06V 10/56*     (2022.01)
*G06V 10/762*    (2022.01)

(52) U.S. Cl.
CPC .......... *G06T 7/90* (2017.01); *G06Q 30/0277* (2013.01); *G06V 10/56* (2022.01); *G06V 10/762* (2022.01); *G06T 2207/10024* (2013.01)

(58) Field of Classification Search
CPC ........... G06T 7/90; G06T 2207/10024; G06Q 30/0277; G06V 10/56; G06V 10/762; G06V 2201/09

USPC ......................................................... 382/162
See application file for complete search history.

(56) References Cited

U.S. PATENT DOCUMENTS

| | | | |
|---|---|---|---|
| 2002/0102018 A1* | 8/2002 | Lin ...................... | G06V 10/255 382/165 |
| 2003/0072044 A1* | 4/2003 | Hashiguchi ........... | G06T 7/0004 358/520 |
| 2005/0251742 A1* | 11/2005 | Mogilevsky .......... | G06F 40/106 715/236 |
| 2011/0060739 A1* | 3/2011 | Zasman ................ | G06F 16/951 707/769 |
| 2011/0125733 A1* | 5/2011 | Fish ................... | G06F 16/90324 707/723 |

(Continued)

*Primary Examiner* — Ali Bayat
(74) *Attorney, Agent, or Firm* — Thorpe North & Western, LLP

(57) ABSTRACT

Technology is described for generating a modified logo using popular colors of a logo file to be used in electronic promotional pages. In addition, options selected by a user, the color of the logo itself and attributes of the electronic promotional pages can be used to filter electronic promotional pages provided. One method may be the operation of detecting a hue, saturation and luminance (HSL) in pixels of a logo file. Another operation may be clustering of the pixels from the logo file into groups based on hue, saturation and luminance (HSL). The colors in the color clusters may be weighted based on area of the logo file occupied by a color. Colors that exceed a defined weighting percentage may be selected as a popular color. Any repeated popular colors may be removed. Then a modified logo may be generated using the popular color selected.

19 Claims, 8 Drawing Sheets

(56) References Cited

U.S. PATENT DOCUMENTS

2013/0022264 A1\* 1/2013 Atsmon ................ G06Q 10/00
382/165

\* cited by examiner

STEP 1 - PRIMARY (Over Population Primary Threshold, 4%)

4%

| Swatch Name | R | G | B | Population | h | s | l | % of Total |
|---|---|---|---|---|---|---|---|---|
| Vibrant | 4 | 171 | 228 | 259010 | 54.2 | 45.5 | 96.6 | 38.9 |
| 1 | 36 | 44 | 60 | 147638 | 61.1 | 18.8 | 25.0 | 22.2 |

STEP 2 - LEFTOVERS (Over Bottom-Line Pop Threshold, 0.2%)

FIG. 1B

STEP 2 - LEFTOVERS (Over Bottom-Line Pop Threshold, 0.2%)

0.2%

| Swatch Name | R | G | B | Population | h | s | l | % of Total |
|---|---|---|---|---|---|---|---|---|
| Vibrant | 4 | 171 | 228 | 259010 | 54.2 | 45.5 | 96.6 | 38.9 |
| 1 | 36 | 44 | 60 | 147638 | 61.1 | 18.8 | 25.0 | 22.2 | population

STEP 3 - OUTLIERS (Leftovers, Not Within Any PRIMARY Cluster's Hue Range)

FIG. 1C

| Swatch Name | R | G | B | Population | h | s | l | % of Total |
|---|---|---|---|---|---|---|---|---|
| Vibrant | 4 | 171 | 228 | 259010 | 54.2 | 45.5 | 96.6 | 38.9 |
| 1 | 36 | 44 | 60 | 147638 | 61.1 | 18.8 | 25.0 | 22.2 | population

FINAL (SEND TO _WATCHY)

MODIFYING PROMOTIONAL MATERIAL USING LOGO IMAGES

Priority is claimed to U.S. provisional application, Ser. No. 63/169,343, entitled "Modifying Logos and Promotional Material Using Popular Colors in Logos", filed on Apr. 1, 2021, which is hereby incorporated herein by reference.

BACKGROUND

The use of computing systems to provide high quality document delivery and electronic graphical images through the internet has continued to move forward. Not only are we able to access more beautiful images through web pages and electronic store fronts, such detailed images, electronic stores and electronic catalogs have continued to become more and more wide spread.

Accessing images, artwork, and photos in electronic store fronts and catalogs is automated when the end user decides to access the information. However, a huge amount of time, energy, photography, and other forms of creative energy have been invested in creating beautiful detail pages for products in electronic store fronts or electronic catalogs. Some of this time is invested in creating, editing, revising, modifying or otherwise processing the images, logos, photographs, borders, mast headers and other elements that go into electronic detail pages or catalog pages for products. In some cases, many custom variations are made for electronic sales pages or electronic catalog pages depending on variations in the products or variations in the customer who will be consuming the product. The ability to create electronic sales pages or electronic catalog pages quickly and efficiently can reduce the costs, time and overall investment that product oriented companies invest into electronic sales pages or electronic catalogs for products.

BRIEF DESCRIPTION OF THE DRAWINGS

FIG. 1B is a chart illustrating popular (e.g., primary) colors over a threshold which have been identified for a logo.

FIG. 1C is a chart illustrating left over colors over a bottom line popular threshold which have been identified for a logo.

FIG. 1D is a chart illustrating selected popular colors to use in revising a logo.

DETAILED DESCRIPTION

A technology is provided for identifying popular colors in a logo file to be used in generating a modified logo and/or promotional pages in a catalog, electronic store front or other electronic or print promotional format. Once popular colors of a logo file have been identified, the modified logo file and logo can be used in electronic promotional pages, electronic catalog pages or similar promotional material.

Figure 1A:
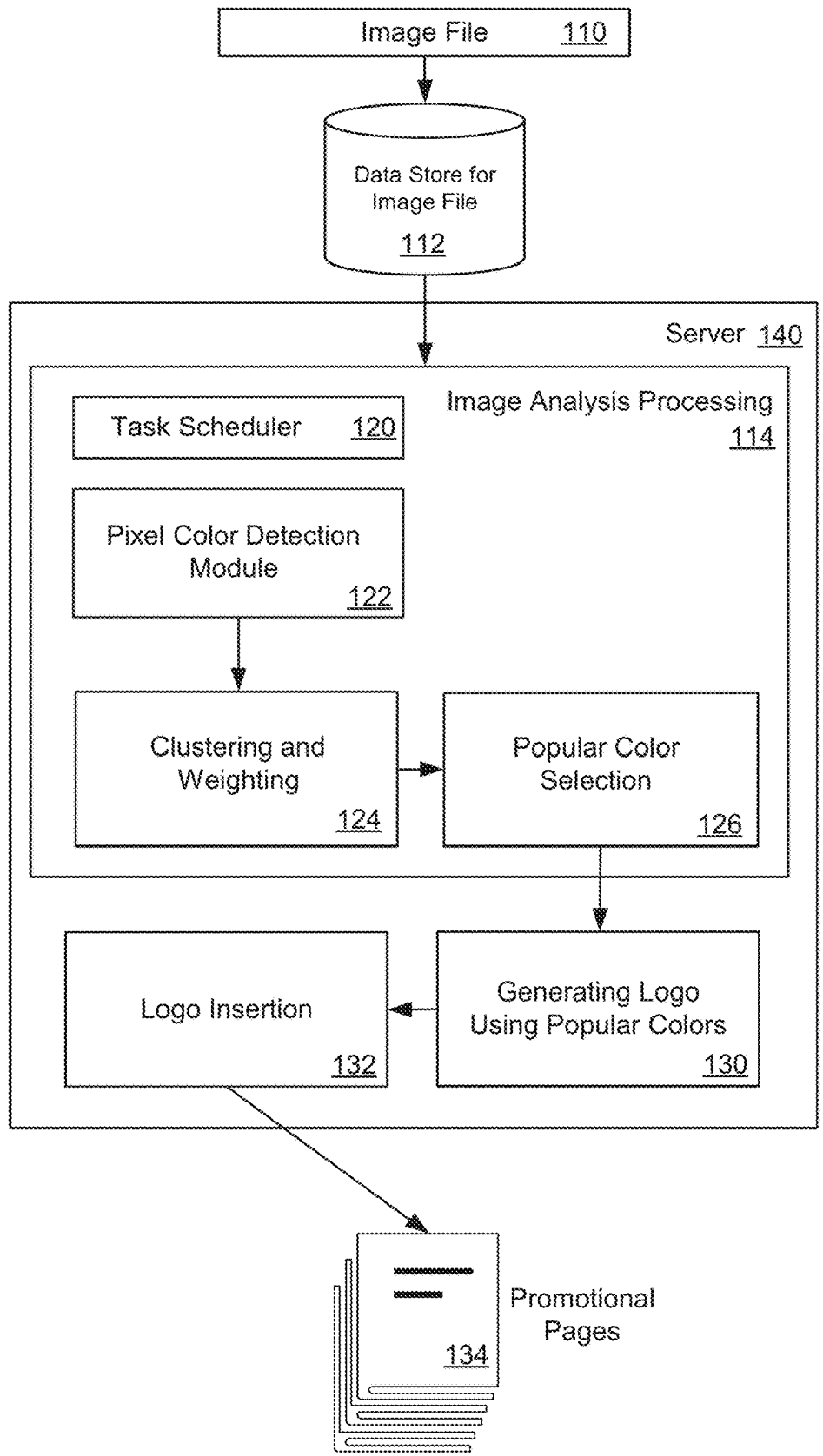
FIG. 1A is a block diagram illustrating an example of system for generating a modified logo and promotional material using popular colors of a logo in a logo file.

FIG. 1A illustrates that a user (e.g., a distributor of products) may be allowed to upload a logo in an electronic file format to an electronic storage location. For example, a web portal may be used to upload and store an image file 110 to a data store 112. The data store 112 may be a cloud storage location, a network file storage location, a database, a NAS (Network Attached Storage) or any other electronic location. The electronic file format may be a file format that is known in advance such as: JPG, .EPS, .AI, .SVG, .PDF, .PNG, .BMP or any other file format in which a logo representation can be stored in an electronic file. Any number of logos may be uploaded for processing through a graphical portal, web portal, web application or upload application.

In one example configuration, the image files with the logos may be uploaded to an object storage service (e.g., Amazon S3, Microsoft Azure Blob Storage, Google Storage, etc.). Then a task scheduler 120 may periodically poll (e.g., every 5 minutes, every minute, or every 30 seconds, etc.) to see when there are one or more logos to download. In one example, the bucket IDs of Amazon S3 storage buckets may be assigned to be checked by the server(s) that execute image analysis processing on logos. When an image file for a logo is found on the object storage service, the logo may be downloaded to the server 140 which provides the image analysis processing 114. At this point, the image analysis processing 114 and modifications to the logo may be initiated.

A modified logo can be generated using popular colors of a logo file identified using an image analysis processing 114 system. The modified logo can ultimately be inserted 132 into electronic promotional pages 134. Examples of the promotional pages 134 may be electronic pages in a catalog of promotional products which may be prepared and sent to a customer. The electronic pages of the catalog may have a placeholder location or a reserved location in the electronic pages where the logo is desired to be inserted. For example, the placeholder location may be on promotional products or private labeled products. Examples of promotional products may include: cups, pens, squeeze balls, etc.

The logo in the image file 110 may be analyzed by an automated process in the image analysis processing unit 114. Scripting (e.g., JavaScript) may be used to make batch files for processing incoming logos based on the parameters in a customer's file or the parameters entered into a browser by a customer.

This analysis process may first determine which palette colors are part of the logo and color code the values from samples of the logo in the image file. More specifically, a color can be determined for each pixel in an image file. The color may be defined by HSL (Hue, Saturation and Luminance), RGB (Red, Green, Blue), CMYK (Cyan, Magenta, Yellow, Black), or another known color definition scheme. This pixel color determination may be made by the pixel color detection module 122. In one example, the logo from the image file may be quantized or sampled (in a vector case) by the pixel color detection module 122 in order to identify sample points (e.g., pixels) for the logo.

The colors may then be clustered and weighted using a clustering and weighting process 124. The colors may be indexed and the colors may be ranked based on the popularity, vibrance, hue, saturation and/or luminance of the color in the logo of the image file. The ranking of the colors may be performed in order to be able to apply colors to the most popular ways of using variations of logos to generate modified logos 130. Examples of logo variations are: full color labels, digital flat bed in full color, screen prints, heat prints (e.g., CAD prints), multiple colors up to three or four colors, or just one color (laser engraving, sand blasting, etc.). For example, there may be multiple variations of the logo created initially.

The colors can be ranked to allow the logos to be displayed accurately based on a branding style where the original logo is in a white background, and the original logo then has the background flooded using the most popular color and the most popular color is filled with white. A large part of the variants for logos in branding (e.g., up to 90%) are covered by taking the most popular color and swapping it out with another color (e.g., white) and flooding the background with the popular color. In addition, the system may detect whether the logo has a background color behind the logo and what the height and width or proportions of the logo are. Based on this information, the logo can be rebuilt into a production-ready format for insertion into an electronic page for an electronic store or an electronic catalog.

For clustering and weighting of the colors to occur, the logo may be decomposed into the component colors of the logo and pixels of a similar color may be grouped together. Each of the colors from the logo can be clustered together (e.g., grouped) with colors that are near to a palette color or near to their own color.

A determination may then be made as to which pixels have a color that is a primary color in the logo and which pixels have a color which is a secondary color in the logo. This determination may include the operation of popular color selection 126. The colors in a cluster may be prioritized by popularity. Popularity can be determined by analyzing the surface area (e.g., number of pixels) occupied by the color in the image file of the logo and/or by analyzing the hues, luminance, and saturation of the colors. For example, the color that occupies the largest surface area may be the most popular color. In addition, the hue range or the vibrance range can be checked to see what is likely to be an actual color and what is likely to be anti-aliasing. In an alternative example, hues, luminance and saturation of a color that are closer to color wheel type of colors may be more popular, where transitional colors between color wheel type of colors may be considered less popular. In this example, colors that are closer to the 12 to 24 colors on a color wheel may be considered more popular.

The cluster can also be analyzed to remove the color problems created by aliasing. In one example, any color that covers over 4% of the logo color may be identified as a popular logo color. This is because a color that covers an area of 4% or greater of the logo is not likely to be an anti-aliasing color. FIG. 1B is a chart illustrating popular colors (e.g., primary colors) over a threshold which have been identified from a logo.

Any colors that cover over 0.2% of the logo may be considered secondary colors or leftovers. These colors may be over the bottom line popularity threshold. FIG. 1C is a chart illustrating leftover colors over a threshold which have been identified for a logo. However, when there are transition colors for anti-aliasing then the HSL deteriorates between the two colors being anti-aliased. Colors below 0.2% of the logo may be considered anti-aliasing colors and these colors may not be selected as the popular color or secondary colors.

Figure 1E:
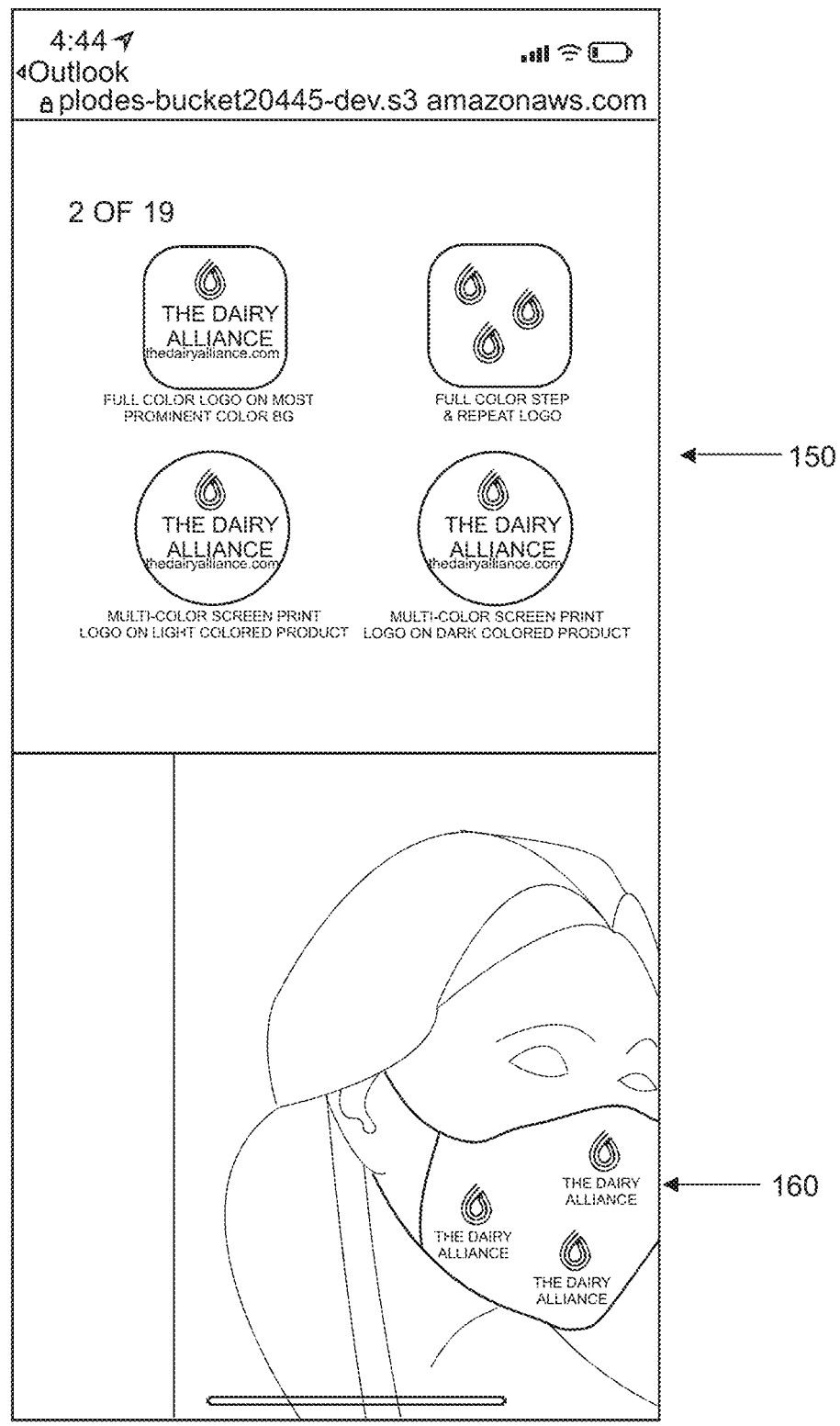
FIG. 1E illustrates variations on a logo using popular colors and the logo placed on a product.

The hue, saturation, and luminance values (HSL) can be checked to see if there are colors within the defined range and these colors can be considered a secondary color in small area. In addition, there may be a color that forms an outlier cluster. If there is an outlier, the outlier color will not cluster with the other popular colors. The outlier color in the outlier cluster should be kept because it is a small but important color. Maintaining small areas of the logo is important to the logo even though removing the anti-aliasing is also desirable. Clustering is used to ensure that important colors are not lost. Clustering may be based on hue, saturation and luminance because the aliased portions will not have strong HSL values. In order to identify the popular colors, the most popular color in each cluster may be selected. FIG. 1D is a chart illustrating selected popular colors to use in creating variations of a logo. FIG. 1E illustrates variations on a logo which may be created using popular colors as backgrounds in various combinations of logos 150.

In one example configuration, the logos can be inserted or applied 132 (FIG. 1) to catalogs of promotional material. The logo may be applied to every promotional product on each page of the catalog. Such promotional catalogs may be created to sell physical promotional products to a single customer. In this case, the logo may be applied to dozens or hundreds of promotional products that a customer might like to buy with their company logo on the product. For instance, the company logo may be applied to mugs, cups, pens, blankets, candy or similar promotional items in the catalog. Color values from the primary color, secondary color(s) and/or other desired colors may be applied to graphic elements on the pages, such as: the graphic bars on the side of the catalog pages, the front cover, page backgrounds, color gradients in the catalog, or other catalog elements.

In an additional example catalog configuration, products with a close color match to the primary color, secondary color, or another color may be identified. Then a catalog consisting of those products with a close color match may be assembled. A copy of the catalog may then be emailed to the customer.

The modified logo(s) may be inserted into the placeholder locations in the catalogs and then the catalog may be published in an electronic format (e.g., as a PDF or other similar file type). This catalog can be published with a unique ID and a unique electronic web page that is accessible to a customer via a network connection. The customer or user may receive an email or SMS (Simple Messaging System) text that allows the customer to access the generated catalog.

As discussed, the logo may be inserted into a placeholder location or reserved location in the catalog or on products in the catalog. Alternatively, placing a logo in the center of a product or placeholder area may be performed using a step and repeat option in one or two color choices for the logo. The step and repeat may provide a repeated series of the logo in a defined area. FIG. 1E further illustrates a logo inserted into a catalog 160 on a product and the use of a step and repeat printing of a logo. Further, the logo may be placed in a full color form for products that can be printed in full color. Other products in the catalog may be populated with the logo based on the printing capability for the product. For examples logos may be provided for products with limited palettes (e.g., two color or one color).

This technology can proof logos submitted by users and convert the logos to production-ready artwork without human intervention. In addition, the process can analyze and rebuild logos to determine whether there are errors in the logos that will cause production errors in producing the electronic catalog or in producing an electronic detail page.

Generally speaking, a distributor for the promotional product catalog manufacturer may obtain a logo from a customer or an end purchaser, and the distributor can submit the logo to be inserted into a catalog. For example, a sales representative of the distributor may take a photograph of a customer logo at their place of business, and submit the logo for processing using their own mobile device. Several minutes after that, the distributor may then walk in the customer's door and give the customer an electronic catalog of customized products that can be purchased and manufactured immediately.

The technology can process logos and change the colors of the logos so that the logos can be better used in electronic marketing. However, checks are made on the logos to ensure that logos will work in the catalog without destroying emblems in the logo, erasing portions of the logo, etc. A logo may be processed to see what type of image the logo is. For example, the logo may be checked to see whether the logo is: 1) A basic logo (text or word brand); 2) an emblem (nested colored areas); or 3) an icon (emblem and text).

In determining the logo type, the connected components in a logo or the contiguous shapes in the logo may be detected. Bounding boxes for the shapes may be identified. The bounding boxes may be a minimum or smallest bounding box or enclosing box for a shape in the logo. The shapes may be ranked (e.g., based on size or area covered) and this enables identification of the inner and outer boxes. If there are colors nested inside of other colors, as identified using the bounding boxes, the logo is determined to be a potential emblem. More specifically, every color is then separated into its own layers. The logo may have white area inserted into the center of the logo. A flood fill from the outside toward the inside may then be performed. After the flood fill, if there is white on the inside of the shapes then there is high probability (e.g., 95% probability) that the logo is an emblem.

Identifying an emblem means that the background cannot be converted to another color without taking preventative measure to protect the emblem. Accordingly, a stroke or mask can be applied around the emblem to protect the emblem when the color changes are made. For example, a white border line (i.e., white stroke) or another border color may be placed around the emblem. Similarly, if there is text underneath the emblem and if the background is flooded with the same color as the text, then a viewer cannot see the text. Thus, the text or other parts with the same problem may be protected like the emblem or simply skipped in the color conversion. Any logo element outside an emblem that has the same color as the flooded background, may need a white stroke around that element too.

Each logo has different proportions. In order to fill up the imprint area without the logo causing problems in other places, empty space or margin area around the logo may be cropped off. Once the logo is cropped, the logo proportion may be validated to ensure the logo goes to the top and/or bottom of the placeholder location (or reserved space). A significant majority of product logo placeholder locations are short and wide imprint areas.

In addition, the placeholder area may have a target size and orientation in the catalog. The placeholder image may have the same size throughout the catalog or multiple sizes of placeholder images may be used in the catalog. In the case of a single size placeholder image, the entire catalog may be designed using one placeholder image. The placeholder image may be just a single color (e.g., black, white, etc.). The placeholder image goes into each area in the catalog where the logo will be. Once the logo variations have been generated, there may be 12 to 15 logo types, for example. The new logos may be inserted into the catalogs where the placeholder image(s) was located. The logo that can be inserted into a placeholder area is dependent on printing capability that is available for each product. For example, the color, texture, manufacturing process (e.g., laser engraving) can be defined for each placeholder area.

This technology provides for many variations of a logo. For example, the 10 to 20 desirable variations of logo may be created. Even if customers may only want a 2-color or 3-color setup, then logo variations can be generated for those color arrangements. Further, if a customer does not want to use a logo with the most popular color and a flooded background, then the customer can pick from other secondary colors (most popular in a cluster as compared to most popular overall in the logo) for modifying the logo.

Logos can be provided for many types of printing, including: screen printing, pad printing and printing using color separation. The processing of the logo can create production ready vector artwork from the originally submitted image files of the logos. In another configuration, the colors may be indexed first. Then the colors are separated by clustering. Finally, full color graphics of the modified logo can be made that go into any type of printing or electronic template that is available. This can provide a web to print pipeline that may proof the logo, transform the logo and prepare the logo for a multitude of printing processes. Thus, the logo processing described can create print-ready files. These print-ready files can be tied into production directly because the logos are production ready art. This provides improved quality for the customer. In addition, the logo can clean up a fuzzy or pixelated logos and convert the logo to a vector image.

One example of using the technology may be a combined text and icon logo. If there is text in a logo underneath the icon, to make a modified marketing composition from the logo, one of the options is to flood the area with the background color that is the most popular color and then turn the logo white. As discussed earlier, this technology indexes all the colors in the area of logo and also defines the palette colors for each color. Past image processing systems might identify 6 colors in an image file of a logo due to anti-aliasing when there are actually 4 colors.

In creating a logo variation on a dark color, the most popular color can be used to flood the background (where the aliases were removed before the flood fill). However, the outside color of emblems may be lost because the outside colors blend into the background. As a result, the technology can check for an emblem which has colors nested inside colors. This is detected as described previously. If the logo does contain an emblem, the emblem may be protected, as described earlier.

A determination may be made as to which colors are touching the outside area of the logo. The system may try to avoid using colors from the outside areas of the logo and may also determine which colors are nested inside other colors. The result is a determination of which colors are outside touching the flooded area and which colors are nested. Being able to identify which colors are touching the outside flooded area means that the loss of colors based on which other colors are adjacent to the color can be avoided. The loss of color can also be avoided by placing a border around the icon or emblem, and the icon or emblem is separated into an isolated area. This separation can apply to a mixed logo (e.g., a text mark and logo). The background of the logo can be flooded with the popular color but the logo can be protected by identifying where the changes may be made without ruining an emblem or other part of the logo.

In previous technologies, a logo has been inserted into the placeholder location and sent out to a customer without any analysis. When using this technology, customers appreciate the extra image analysis processing and logo modification steps which suggests what the customer may want without the customer having to ask for the logo changes.

Figure 2:
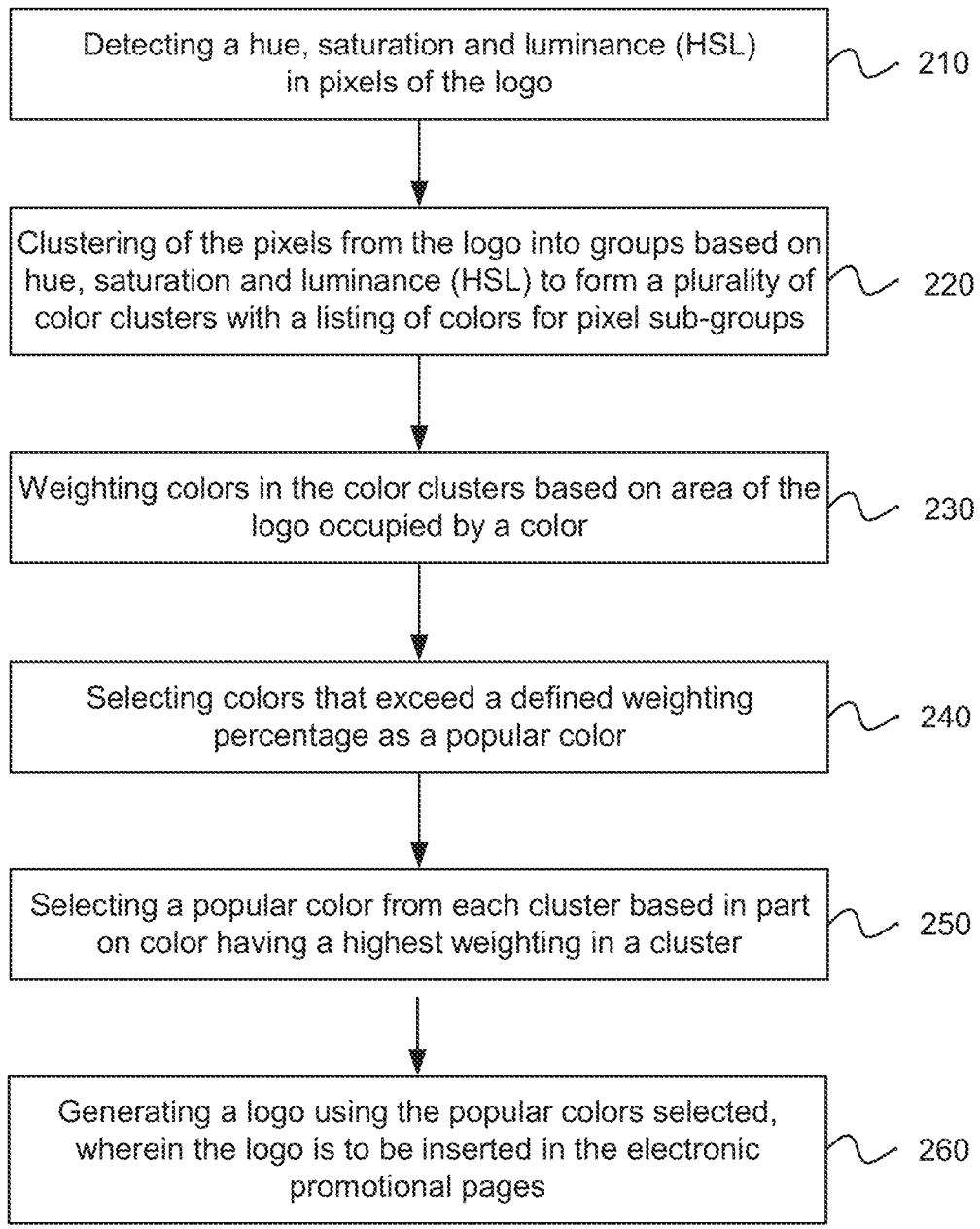
FIG. 2 is an example of a flowchart illustrating a method for generating a modified logo and promotional material for electronic promotional pages using popular colors of a logo in a logo file.

FIG. 2 is a flow chart illustrating an example method for determining popular colors of a logo to be used in electronic promotional pages. An initial operation in the method may be receiving a logo file to be inserted into a promotional environment in the electronic promotional pages. The logo file may be a data file in computer readable format that is uploaded by a user who has the logo file in an electronic format in their possession. The logo file may be uploaded and stored in a data store (e.g., a database). In one example, the data store may be a bucket stored in a public service provider environment or cloud such as Amazon's S3.

The logo file may be opened and processed to detect a hue, saturation and/or luminance (HSL) of each of the pixels in the logo file, as in block 210. The pixels from the logo may be clustered into groups based on hue, saturation and/or luminance (HSL) to form a plurality of color clusters with a listing of colors for pixel sub-groups, as in block 220. In a specific example, the clustering of the pixels may be performed using a K-means clustering process or other Artificial Intelligence and non-Artificial Intelligence clustering processes. Other clustering methods or machine learning based clustering methods may also be used.

The colors in the color clusters may be weighted based on area of the logo occupied by a color, as in block 230. Any colors that exceed a defined weighting percentage may be selected as a popular color, as in block 240. The defined weighting percentage may be set at a percentage from 1% up to 6%. For example, when the weighting for a specific color exceeds 2% then that color can be selected as a popular color. This is because aliased areas of a logo in a logo file will likely be below 2% and even more likely below 0.2%.

Colors in a cluster that have lower weights based on a lower area of the logo that is occupied, as compared to colors in the cluster which have higher areas of the logo occupied, may be discarded. For example, the colors in a color cluster with the lowest weight may be discarded because that lowest weight is believed to be a color created by anti-aliasing. This type of discarding rule might also be used for two, three or more of the lowest ranking colors as determined by weight.

A popular color from each cluster may be selected based in part on color having a highest weighting in a cluster, as in block 250. This selection organization also enables outlier colors (e.g., small color area) to be identified, which are not antialiasing colors in the logo file. Any repeated popular colors identified may then be removed.

A modified logo may then be generated using the popular colors selected, as in block 260. As discussed in an earlier example, the background may be flooded with the most popular color and the logo may be turned white. Other logo modification variations may be performed too. For example, the background might be flooded with the most brilliant color, etc. The logo file or representation of the logo may then be inserted in the electronic promotional pages. In one example configuration, the logo may be inserted in placeholder locations in a catalog of products. In addition, supporting colors on a catalog page may be modified using the popular colors or secondary colors in order to match the supporting colors to the logo representation. The supporting colors in a catalog page may be modified in areas of the page such as: backgrounds, mast headers, graphic bars, product colors, page decorations, or font colors.

A higher resolution version of the image representation in the image file may also be created replacing any of the colors in a color cluster, which are not the popular color of the color cluster, with the popular color from the color cluster. This may result in most or even all of the anti-aliasing in the logo being removed. This less degraded version of the logo may be used for inserting in the catalog. Further, a vector image of the logo may be created. More specifically, a vector logo may be generated from the logo which has been color separated by replacing non-popular colors in a color cluster with the popular color. After the colors have been replaced, then the well-defined boundaries of the image at the boundaries of the popular color areas may be converted into vectors for the vector version of the logo representation.

In one configuration of the technology, a determination of whether an emblem exists in the logo may be made. To determine whether there is an emblem in the logo at least two determinations need to be made. A first determination can be made to identify whether the logo contains bounding boxes within a larger bounding box. A bounding box is the border of a contiguous area of color in the logo. This border may follow the irregular shape of the colored area. Alternatively, the border of bounding box may circumscribe the colored area and the bounding box may be in the shape of a square, a rectangle, circle, oval or another simple shape. The bounding box of each connected color area may be identified. Each color area may have X, Y coordinates, a width, and a height. This area information may assist with finding the bounding boxes used to apply the rules.

To find the emblem, the first bounding box for the outside color area is identified. Then bounding boxes inside the first bounding box are identified. This operation may be called encompass colors. If boxes are found that are encompassed within the outside boxes then satisfying this check may be the first step identifying an emblem. As discussed, the bounding boxes allow nested colors to be identified, which in turn identifies an icon without the customer or a human identifying the emblem or icon.

A second determination may also be made in order to identify whether there is an emblem in the logo representation. A popular color may be selected, and this will most frequently be the most popular color in the logo. The popular color will be used to flood fill the area outside the logo. A center area of what may be detected to be a potential emblem may then be tested to see if the popular color has entered into one or more internal bounding boxes. If the one or more internal bounding boxes are not filled during the flood fill process then the logo may be determined to have an emblem. If one more internal bounding boxes do not contain any of the popular color, then the area contained in the internal bounding boxes may be considered an emblem. In a similar but alternative test, a center area may be filled with white and a flood fill may delete any colors that are contiguous with the outer background (flood fill does not jump over any solid colors). Then the flooded area may be tested and if there is white remaining in the inner area, then the color is encompassed within another encompassed color.

To summarize the finding of an emblem. 1) Look for the encompassed areas. 2) Flood the logo with the popular color and then get rid of the outside bounding box to see if the flooded popular color reaches the middle. If there is a hole in the area identified by the inner bounding boxes then the area is not an emblem, and the original color may be removed from the middle of the logo.

In some situations, the outside of logos with shadowing or other light and dark combination in the logo should not be flood filled with white or it may ruin the icon. For example, flood filling with white may destroy what is often a shadow for the logo or other lights and darks in the logo.

Color Profiling System

A color profiling system may also be provided to process logos when the logo files are received from user. The images from the logo files may inserted into a catalog of promotional items or overlaid onto other types of objects in electronic pages for presentation or marketing purposes. The color profiling can detect colors, categorize a color with a color label and apply the colors of submitted logos to products and electronic page objects (e.g., colors overlaid on a product, color in backgrounds, color in decorations, etc.) which may be combined into a catalog of items or other marketing and promotional material.

The color profiling system can identify the dominant or main colors of logos and can apply these colors to elements in the electronic promotional pages. Variants of the logos and/or colors that may compliment the colors of the logos may also be identified and applied. The actual colors in the logos may be identified and labeled using a set of color ranges defined by hues. For example, the color ranges may be defined using color ranges of hues in a color wheel. In this technology, the ranges of individual hues may be defined by human perceived color boundaries. In the past, the boundaries of colors have been separated by dividing the hues in a color wheel mathematically into equal sections of 13.3 degrees of values per hue in a 360 circle. However, this type of mathematical division of hues does not match real human perception. Thus, in the present technology, the colors have been divided up with boundaries that match what the eye actually perceives as a specific color.

The color of a promotional product, background and other artistic elements can be matched to the colors of the logo provided by a user or customer. For example, there may be a template or template options for each color found in a logo. The various templates and layouts with many color options (e.g., a template for red, a templated for black, etc.) may be made prior to receiving logos, and then a template can be selected and/or filled in using the dominant or selected colors of the logo. For example, a logo may have green as a dominant color or selected color, then the template containing a green product may be selected and other items in the template may be green too.

In particular, some of the human perceivable color ranges or hue ranges may be defined as: red, blue, green, chartreuse, orange, gold, teal, cyan, purple, or pink. In addition, some neutral colors may also be defined with a human perceivable hue range, such as: white, black, silver, or unsaturated neutrals. The color definitions may also include whether a color is saturated or unsaturated and/or how much saturation or desaturation may be associated with the color.

The indexing of the hues or colors using human perceived boundaries provides an output that is perceived as more accurate by users and is otherwise not available with mathematical hue or color division schemes. In this way, the human perceived color ranges are similar to a lab color profile because the "scientific" or mathematical hue range values do not provide good matches to colors from logos, as perceived by humans. Instead, this technology uses colors ranges that reflect what the eye naturally perceives. For example, pink may be in the hue range 0-19 and red may be in the hue range 20-40. On the other hand, blue may be in the hue range 220-280, where these hue range values represent values from a 360 degree color wheel. The blue hue range can be larger because cooler colors have more variance or a broader range that a human's eye can actually see and perceive as blue. These perceived color ranges may be created because the eye and cones in the eye act differently than might be expected mathematically.

A straight mathematical division or selection for hue ranges does not tend work for defining a hue range for a color. In the case of the color red, the hue range is smaller because there are only so many variations of red a person's eye can perceive. Thus, the perceived color ranges of a color spectrum can be used to identify where each hue from a logo falls in the perceived color ranges of a color spectrum. This matching of the logo colors into the perceived color ranges of the color spectrum then provides a better match to the colors in: the pre-generated templates, the colors of the products showcased in the templates, and the colors used to modify the templates, artistic items in the templates or fill any of the other items in the templates.

In another example, if a logo with red and green has been submitted, a red pen can be selected as a product on which to put the logo. Then part of the logo can be converted to white. In this case, where the indexed colors are "green and red", the red could be reversed to white. Alternatively, the same could be done for the green color. In addition, the imprint area can be a different color than the promotional item, if desired. For instance, a logo that goes on a white pen (e.g., a neutral color) may not be changed at all.

This technology can use rules to pick colors a customer would actually want to use to complement their logo. Any variations of the logo that would not compliment the logo are not shown. Consider the example of a logo that is dominated by green with a red accent. In this case, a template with a green promotional item (e.g., a pen) may be selected and the logo may be placed on the green pen at electronic document assembly time but the template would have been prepared in advance. In this example, complimentary colors for the dominant green might be black, white, green or silver, and those are the only product placement variations that may be provided or displayed to the user or customer who submitted the logo. This avoids the customer having to sift through irrelevant color options when seeing their logo on promotional products or in other marketing images.

Since every logo is analyzed upon submission, each different logo that is submitted can create a different promotional product catalog or other type of product catalog for the end user. The system can identify one or more desired color variants related to the logo for which to provide matching color compliments, and then the appropriate templates with products or promotional products can be provided for that logo. For example, the images of the promotional products or products may be separated out into their own layer that is a separate color and then combined into a final electronic page. Every color variant or color modified element for a web page may have been created in advance. The background, product, and product color can be selected and then the logo may be placed on the product and/or background. Elements of the electronic pages can be turned off or on in order to compose the final electronic page. In addition, elements of the electronic pages may contain transparent areas, as needed in the electronic page compositions.

In one example of the operations for generating the electronic pages, a method can be provided to modify a graphical template for page output. The method may include dividing a color spectrum into color segments as defined by human perceived color boundaries for the hue ranges of the color spectrum. For example, the color blue may be defined not by the 13.3 degrees of the hue wheel that could be considered mathematically blue but may the color blue also include parts of the hue spectrum that the eye perceives as blue (even if those hues might be outside the 13.3 degrees of the hue wheel considered blue in the past).

Another operation may be matching a color from the logo file to a color segment in the perceived color ranges. This is taking the sampled color from a logo, and determining which boundary the color falls into on the perceived color ranges.

Yet another operation may be applying the color to a visual template for displaying a product. The color applied to the visual template may control at least one of: a background color, a promotional product color, a decoration color, or another color segment in the visual template.

Further, the logo may be overlaid onto the product within the template for an electronic page. The logo may be located at a logo placement location in the template that has been pre-defined. Finally, a product catalog with pages of promotional products or general products that illustrate the logo on them may be generated.

A number of attributes related to the logo and product manufacturing method may control what products, colors, electronic pages and logo attributes are displayed to an end user or customer. For example, a data store may track the attributes of: step and repeat, skew, transformation, scaling, warping, multi-color imprint, one-color imprint method, laser printing, color printing, color ranges to match, size of imprint area, offset from center of image, rotation, screen printing on background, basic screen printing, full color printing, and black printing. These attributes can be used to filter the templates used to show product samples to an end user in a catalog. For example, if the black printing attribute is set then the logo should only be provided in black on products and no other color options or color compliments should be provided.

Additional attributes that can affect the catalog may be: product number, item color, imprint area size, offsets, rotation, available in 1 color, background color, etc. There are many other variations that can presented to a user or customer for the user's input. For the full-color printing attribute, then every color option may be available. If it is one color printing, then some color options are not available.

The system processes the various layers for the electronic pages, determines where the logo variations occur, determines where the colors are needed, and determines where to replace these colors. In another example, if a logo is red and black, the background color the catalog presents are the most common options (e.g., red, white, black, etc.). There are some situations where some of the logo colors are turned to white and then the options available for display to a user may increase.

In addition, a rotation for page elements may also be applied. This may include transforming or warping the logo to place the logo into the electronic page. Another example of an attribute is that the color of the laser engraving process is slate, as shown in electronic pages. Further, the system can set the colors for the parameters the customer may want or select.

Size attributes may also exist for the logo. The logo may have attributes such as: height, width, color, number of colors, etc. The system can determine what options or attributes (e.g., size, color, orientation, etc.) are possible for a specific product placement or promotional product as compared to the logo that has been provided. When the color of the product, size of the product, printing placement and similar attributes are known, then it can be determined whether and how the logo can be applied on the product or promotional product.

A format conversion tool may be used to convert logos to vector graphics format or to higher resolution pixel formats. For example, a scalable vector graphic format may enable every area in a logo to have the color quickly changed.

As mentioned previously, the colors from the logo are detected upon submission of the logo through a graphical user interface or web application. Once the colors have been isolated, then the colors are used by the rules in setting the electronic page parameters and these changes can be driven in part by the colors of the logo.

The colors of products or promotional products can be measured in advance. For example, a colorimeter or color sensor can be used to measure the color of a real world product or promotional product. The colorimeter or color detection device may detect the hue range or LCH (Luminance, Chroma, and Hue) of a product. Such measurements may be taken and also used to create the parameters of the different color ranges or color groups based on perceived colors (i.e., the perceived color ranges).

The color system may take into account attributes about the products themselves. For example, a definition of what the product is or the products capabilities may be set to a true or false value or a numerical range value. The attributes that are set can define what colors the user sees in the electronic pages (e.g., catalog). In one example, some customers do not allow any changes to their logo at all. This directly affects what color choices can be presented in the electronic pages.

In another example, a different background layer may be used in electronic pages depending on the business vertical market the customer is in. For example, different layers may be provided depending on whether the vertical is: tech, medical, pharmaceutical, dental, legal insurance, energy, etc. The electronic page can also use a layer for the vertical in the background that is a specific color.

In order to create a dynamic catalog, the layers of a template are created in advance with transparencies and defined colors. Rules are then applied to the select the appropriate templates and layers based on the attributes currently set for the logo, products and customer. Then the layers and templates can be assembled. This layering of templates can affect the color of the background, product color, decoration, logo, etc.

In one example, the desired color of the product is overlaid on the photo of the product. In addition, the background may be set as the most prominent color of the logo. The underlay can be a template which may provide full control over the background or what embellishment is in the electronic page. For example, the background can provide graphics for a vertical product area (e.g., "dental", "insurance", "legal"). Furthermore, certain products are only available to defined verticals. Tech companies generally do not desire to see lotions, make-up, etc. In addition, different backgrounds for different verticals can use varying photos and backgrounds depending on the vertical. The variations to the logos can also be turned on or off.

Figure 3:
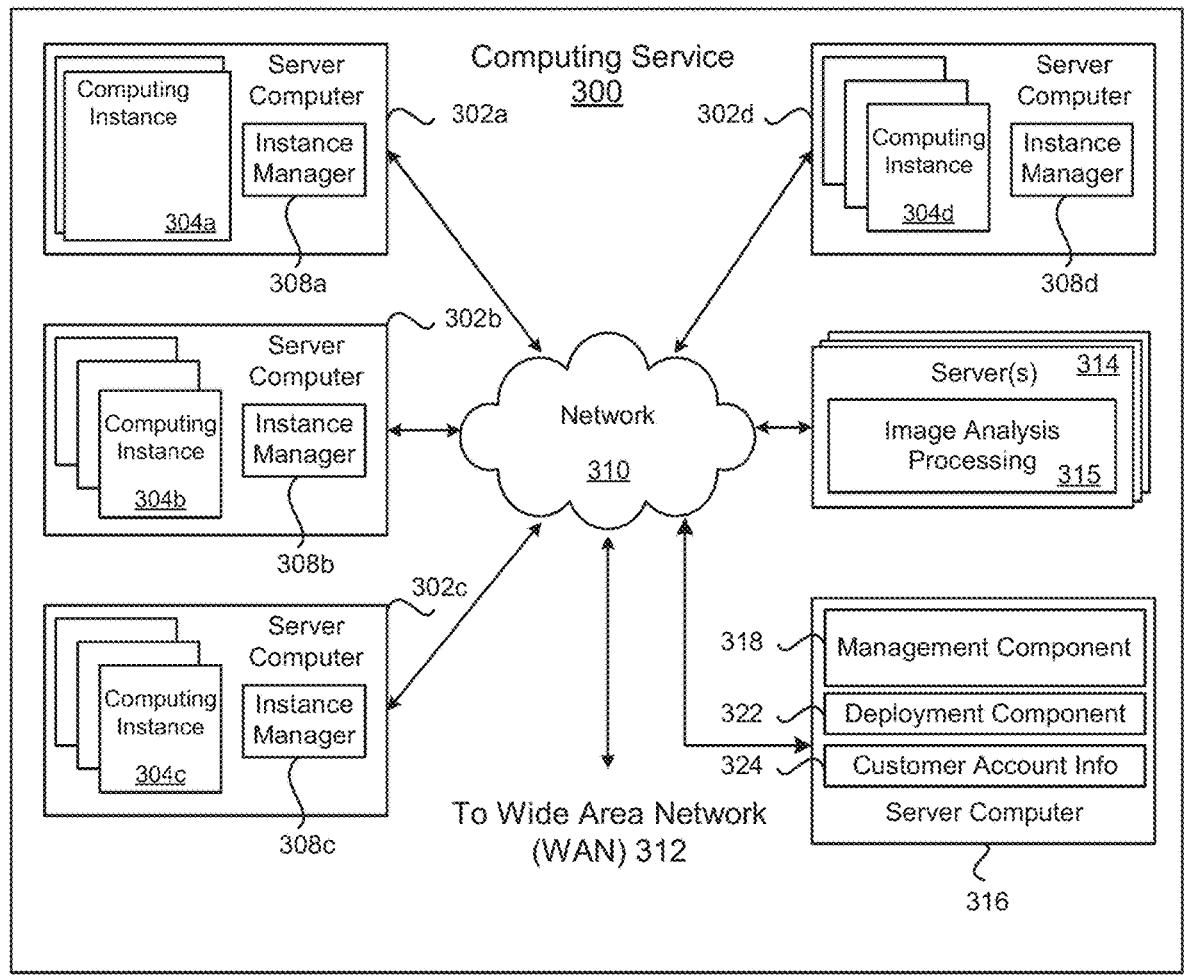
FIG. 3 is a block diagram of an example of a service provider environment or cloud environment upon which the technology may be executed.

An example listing of attribute variations that can be used in creating an electronic page or products or promotional products is listed below.
 1. Step and repeat
 2. Skewed
 3. Transformation
 4. Scaling
 5. Warping
 6. Multi-color imprint 7. One-Color imprint
8. Laser Printing
9. Color Printing
10. Ranges to match
11. Size of imprint area
12. Offset from center of image
13. Rotation
14. Screen printing on background
15. Regular screen printing
16. Full color
17. Black Print
18. White Print
19. Prominent Color Print
20. Vibrant Color Print
21. Imprint transformation
22. Warping
23. Keywords—Earth Friendly, Made in the USA, Under $5
24. Associated Items—recommended items
25. Step and Repeat FIG. 3 is a block diagram illustrating an example computing service 300 that may be used to execute and manage a number of computing instances 304a-d upon which the present technology may execute. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS") and/or Software as a Service ("SaaS"). Other models may be provided. For the IaaS model, the computing service 300 may offer computers as physical or virtual machines and other resources. The virtual machines may be run as guests by a hypervisor, as described further below.

Application developers may develop and run their software solutions on the computing service system without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 800 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e., a computer) that executes applications like a physical machine. In the example of a virtual machine, each of the server computers 302a-d may be configured to execute an instance manager 308a-d capable of executing the instances. The instance manager 308a-d may be a hypervisor, virtual machine manager (VMM), or another type of program configured to enable the execution of multiple computing instances 304a-d on a single server. Additionally, each of the computing instances 304a-d may be configured to execute one or more applications.

A server 314 may be reserved to execute software components for implementing the present technology or managing the operation of the computing service 300 and the computing instances 304a-d. For example, the server 314 or computing instance may include the image analysis processing 315.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache is to be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302a-d. The network topology illustrated in FIG. 3 has been simplified, as many more networks and networking devices may be utilized to interconnect the various computing systems disclosed herein.

Figure 4:
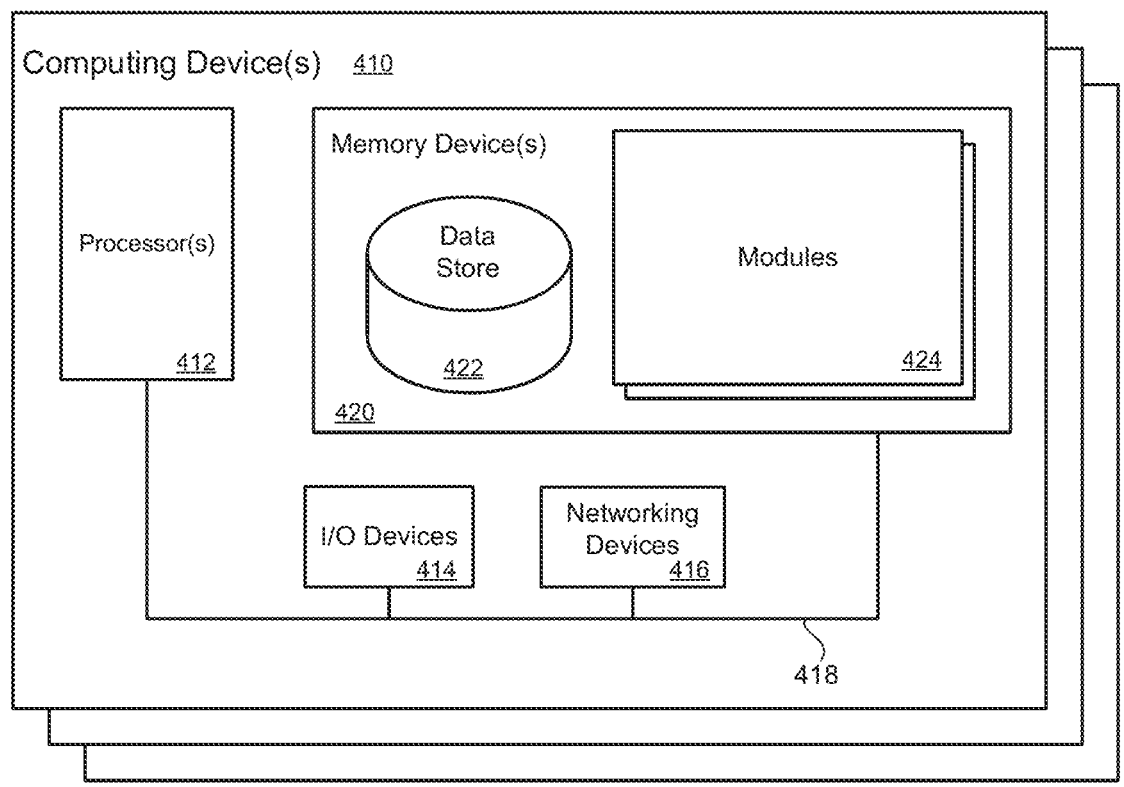
FIG. 4 is a block diagram illustrating an example of computer hardware upon which the technology may be executed.

FIG. 4 illustrates a computing device 410 which may execute the foregoing subsystems of this technology. The computing device 410 and the components of the computing device 410 described herein may correspond to the servers and/or client devices described above. The computing device 410 is illustrated on which a high-level example of the technology may be executed. The computing device 410 may include one or more processors 412 that are in communication with memory devices 420. The computing device may include a local communication interface 418 for the components in the computing device. For example, the local communication interface may be a local data bus and/or any related address or control busses as may be desired.

The memory device 420 may contain modules 424 that are executable by the processor(s) 412 and data for the modules 424. For example, the memory device 420 may include an inflight interactive system module, an offerings subsystem module, a passenger profile subsystem module, and other modules. The modules 424 may execute the functions described earlier. A data store 422 may also be located in the memory device 420 for storing data related to the modules 424 and other applications along with an operating system that is executable by the processor(s) 412.

Other applications may also be stored in the memory device 420 and may be executable by the processor(s) 412. Components or modules discussed in this description that may be implemented in the form of software using high programming level languages that are compiled, interpreted or executed using a hybrid of the methods.

The computing device may also have access to I/O (input/output) devices 414 that are usable by the computing devices. An example of an I/O device is a display screen that is available to display output from the computing devices. Other known I/O device may be used with the computing device as desired. Networking devices 416 and similar communication devices may be included in the computing device. The networking devices 416 may be wired or wireless networking devices that connect to the internet, a LAN, WAN, or other computing network.

The components or modules that are shown as being stored in the memory device 420 may be executed by the processor 412. The term "executable" may mean a program file that is in a form that may be executed by a processor 412. For example, a program in a higher-level language may be compiled into machine code in a format that may be loaded into a random-access portion of the memory device 420 and executed by the processor 412, or source code may be loaded by another executable program and interpreted to generate instructions in a random-access portion of the memory to be executed by a processor. The executable program may be stored in any portion or component of the memory device 420. For example, the memory device 420 may be random access memory (RAM), read only memory (ROM), flash memory, a solid-state drive, memory card, a hard drive, optical disk, floppy disk, magnetic tape, or any other memory components.

The processor 412 may represent multiple processors and the memory 420 may represent multiple memory units that operate in parallel to the processing circuits. This may provide parallel processing channels for the processes and data in the system. The local interface 418 may be used as a network to facilitate communication between any of the multiple processors and multiple memories. The local interface 418 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom Very Large Scale Integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

In describing the present technology, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide.

Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for generating a modified logo using popular colors of a logo file to be used in electronic promotional pages, comprising:
    detecting a hue, saturation and luminance (HSL) in pixels of the logo file to be used in an electronic promotional page;
    clustering of the pixels from the logo file into groups based on hue, saturation and luminance (HSL) to form a plurality of color clusters with a listing of colors for pixel sub-groups;
    weighting colors in the color clusters based on area of the logo file occupied by a color;
    selecting colors that exceed a defined weighting percentage as a popular color;
    selecting the popular color from each color cluster based in part on the color having a highest weighting in the color cluster, in order to identify outlier colors which are not antialiasing colors in the logo file;
    removing any repeated popular colors; and
    generating a modified logo using the popular color selected, wherein the modified logo is to be inserted in the electronic promotional page.

2. The method as in claim 1, further comprising inserting the logo file in placeholder locations in a catalog of products and modifying supporting colors on a catalog page using the popular colors.

3. The method as in claim 1, further comprising clustering of the pixels using a K-means clustering process.

4. The method as in claim 1, further comprising, modifying supporting colors in a catalog page in at least one of: backgrounds, mast headers, product colors, page decorations, or font colors.

5. The method as in claim 1, further comprising discarding colors in the color cluster that have lower weights based on a lower area of the logo file that is occupied as compared to colors in the color cluster which have higher areas of the logo file occupied.

6. The method as in claim 1, further comprising setting the defined weighting percentage at a percentage from 2% up to 6%.

7. The method as in claim 1, further comprising:
    replacing any colors in a color cluster, which are not the popular color of the color cluster, with the popular color from the color cluster; and generating a vector logo file from the logo file which has been color separated by replacing non-popular colors in a color cluster with the popular color.

8. The method as in claim 1, further comprising determining whether a logo is an emblem by determining a) whether the logo contains bounding boxes within a larger bounding box and b) using a flood fill process selected from the popular colors to verify that colors in internal bounding boxes are not filled during the flood fill process.

9. The method as claim 1, receiving the logo file to be inserted into a promotional environment in the electronic promotional page.

10. The method as in claim 1, further comprising:
dividing a color spectrum into color segments as defined by human perceived color boundaries;
matching a color from a logo in the logo file to a color segment in the color spectrum; and
inserting the color into a visual template for displaying a product with the logo overlaid onto the product.

11. The method as in claim 10, wherein the color inserted into the visual template controls a background color, a promotional product color or another color segment in the visual template.

12. A system, comprising:
at least one processor;
at least one memory device including a data store to store a plurality of data and instructions that, when executed, cause the system to:
receive a logo file to be inserted into a promotional environment in electronic promotional pages;
detect a hue, saturation and luminance (HSL) in pixels of the logo file;
cluster of the pixels from the logo file into groups based on hue, saturation and luminance (HSL) to form a plurality of color clusters with a listing of colors for pixel sub-groups;
weight colors in the color clusters based on area of the logo file occupied by a color;
select colors that exceed a defined weighting percentage as a popular color;
select a popular color from each cluster based in part on the color having a highest weighting in a cluster, in order to identify outlier colors which are not antialiasing colors in the logo file;
remove any repeated popular colors; and
generate a modified logo using the popular color selected, wherein the modified logo is to be inserted in the electronic promotional pages.

13. The system as in claim 12, further comprising inserting the logo file in placeholder locations in a catalog of products and modifying supporting colors on a catalog page using the popular color.

14. The system as in claim 12, further comprising clustering of the pixels using a K-means clustering process.

15. The system as in claim 12, further comprising, modifying supporting colors in a catalog page in at least one of: backgrounds, mast headers, product colors, page decorations, or font colors.

16. The system as in claim 12, further comprising discarding colors in a cluster that have lower weights based on a lower area of the logo file that is occupied as compared to colors in the cluster which have higher areas of the logo file occupied.

17. The system as in claim 12, further comprising setting the defined weighting percentage at a percentage from 2% up to 6%.

18. A method to modify a graphical template for electronic page output, comprising:
dividing a color spectrum into color segments as defined by human perceived color boundaries of the color spectrum to form perceived color ranges;
matching a color from a logo file to a color segment in the perceived color ranges; and
applying the color to a visual template for displaying a product;
overlaying a logo from the logo file onto the product within the visual template for an electronic page; and
displaying the electronic page with the product and logo from the logo file to a user;
wherein the color inserted into the visual template controls a background color, a promotional product color or another color segment in the visual template.

19. A method to modify a graphical template for electronic page output, comprising:
dividing a color spectrum into color segments as defined by human perceived color boundaries of the color spectrum to form perceived color ranges;
matching a color from a logo file to a color segment in the perceived color ranges; and
applying the color to a visual template for displaying a product;
overlaying a logo from the logo file onto the product within the visual template for an electronic page; and
displaying the electronic page with the product and logo from the logo file to a user;
wherein attributes used to assemble electronic pages are at least one of: step and repeat, skew, transformation, scaling, warping, multi-color imprint, one-color imprint, laser printing, color printing, color ranges to match, size of imprint area, offset from center of image, rotation, screen printing on background, basic screen printing, full color printing, or black printing and are used to filter graphical templates selected to form electronic pages created to show product to a user.

* * * * *